United States Patent
Solis Mondragon et al.

(10) Patent No.: US 9,827,919 B2
(45) Date of Patent: Nov. 28, 2017

(54) VEHICLE FLOOR BRACKET

(71) Applicant: GM GLOBAL TECHNOLOGY OPERATIONS LLC, Detroit, MI (US)

(72) Inventors: Luis Javier Solis Mondragon, Tlalnepantla (MX); Gustavo Valencia Aguirre, Uruapan (MX); Jose Javier Mejia Pavon, Toluca (MX); Hector Alejandro Castro Nunez, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 62 days.

(21) Appl. No.: 14/878,359

(22) Filed: Oct. 8, 2015

(65) Prior Publication Data
US 2017/0101065 A1   Apr. 13, 2017

(51) Int. Cl.
*B62D 43/06* (2006.01)
*B60R 13/01* (2006.01)
*B62D 25/20* (2006.01)
*B60R 5/04* (2006.01)

(52) U.S. Cl.
CPC .............. *B60R 13/011* (2013.01); *B60R 5/04* (2013.01); *B62D 25/20* (2013.01); *B60R 13/013* (2013.01)

(58) Field of Classification Search
CPC ...... B60R 13/011; B60R 13/013; B62D 25/20
USPC ........................................... 296/24.43, 24.44
See application file for complete search history.

(56) References Cited

U.S. PATENT DOCUMENTS

| | | | | |
|---|---|---|---|---|
| 2,063,092 A | * | 12/1936 | Groden ................ | B62D 43/10 296/37.2 |
| 2,091,071 A | * | 8/1937 | Girl ....................... | B60P 3/07 224/42.13 |
| 5,065,920 A | * | 11/1991 | Amner .................. | B60R 7/043 224/275 |
| 6,247,741 B1 | * | 6/2001 | Seel ...................... | B60R 5/00 296/37.14 |
| 6,779,824 B1 | * | 8/2004 | Lazarevich ........... | B60P 1/003 296/37.6 |
| 6,883,851 B2 | * | 4/2005 | McClure ............... | B62D 43/10 224/42.2 |
| 6,926,348 B2 | * | 8/2005 | Krueger ................ | B62D 25/087 224/403 |
| 7,410,081 B2 | * | 8/2008 | McClure ............... | B62D 43/10 224/403 |
| 7,600,800 B2 | * | 10/2009 | Suzuki .................. | B60R 5/04 296/37.14 |
| 8,231,164 B2 | * | 7/2012 | Schubring ............. | B60R 7/04 224/404 |
| 2007/0065264 A1 | * | 3/2007 | Sturt ...................... | B60R 5/041 414/545 |

* cited by examiner

*Primary Examiner* — Pinel Romain
(74) *Attorney, Agent, or Firm* — Quinn IP Law

(57) ABSTRACT

A floor bracket includes a first bracket portion extending along a longitudinal axis, a second bracket portion, and a third bracket portion coupled between the first bracket portion and the second bracket. The floor bracket further includes at least one hook extending from the second bracket portion toward the third bracket portion.

9 Claims, 3 Drawing Sheets

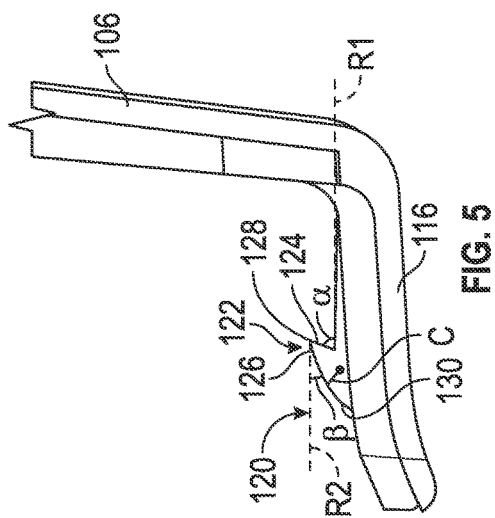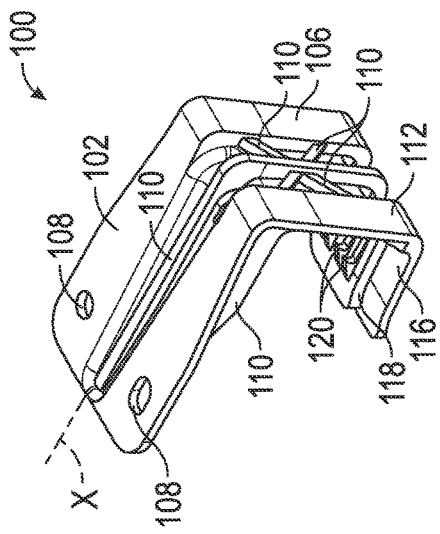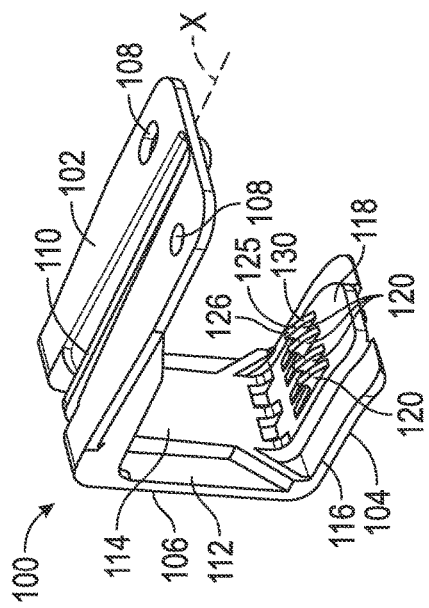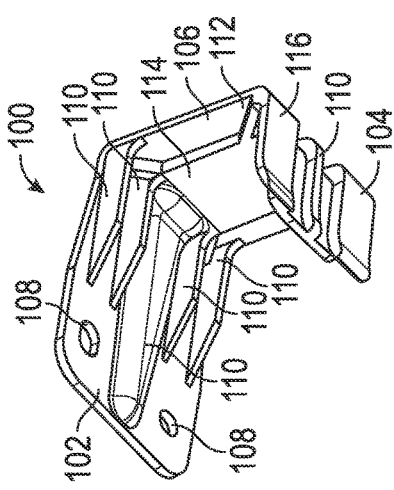

VEHICLE FLOOR BRACKET

TECHNICAL FIELD

The present disclosure relates to a floor bracket and a load floor assembly including a floor bracket coupled between a storage tray and a floor cover.

BACKGROUND

Some vehicles include a load floor assembly for supporting and carrying cargo inside the vehicle body. For example, in some vehicles, the load floor assembly is in the trunk and can support the weight of several objects. As such, vehicle drivers or passengers can place objects, such as tools, in the trunk of the vehicle, and the load floor assembly can support those objects.

SUMMARY

A load floor assembly includes a storage tray and a floor cover. The floor cover can be moved from a closed position to an open position to gain access to a cavity of the storage tray. Although the floor cover can move relative to the storage tray, the floor cover should be coupled to the storage tray particularly when an external force is applied to a frontal outer surface of the vehicle body. To this end, the present disclosure describes a floor bracket capable of maintaining the floor cover coupled to the storage tray even when an external force is applied to a specific part of the vehicle, such as the frontal part of the vehicle.

As a non-limiting example, the presently disclosed floor bracket includes a first bracket portion extending along a longitudinal axis, a second bracket portion, and a third bracket portion coupled between the first bracket portion and the second bracket portion. The floor bracket further includes at least one hook extending from the second bracket portion toward the third bracket portion. The present disclosure also describes a vehicle including the floor bracket.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 4 is a schematic, front perspective view of the floor bracket;

FIG. 5 is a side, fragmentary view of the floor bracket;

FIG. 6 is another schematic, front perspective view of the floor bracket;

FIG. 7 is a schematic, rear perspective view of the floor bracket;

DETAILED DESCRIPTION

Figure 2:
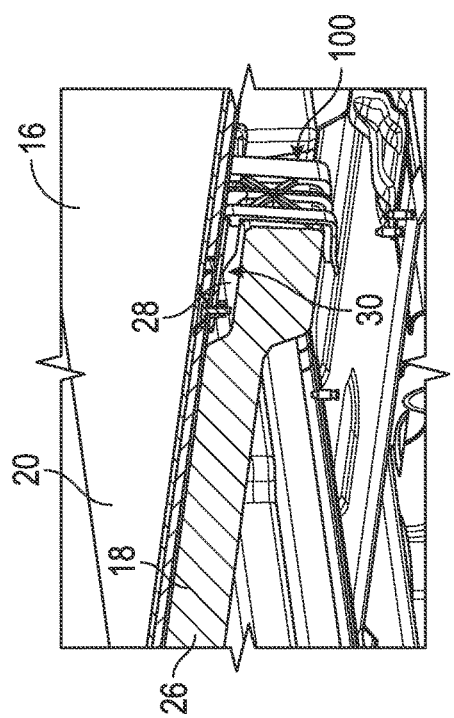
FIG. 2 is a schematic, perspective, fragmentary sectional view of the load floor assembly of the vehicle shown in FIG. 1, wherein the load floor assembly includes a floor bracket coupled between a storage tray and a floor cover.
Figure 3:
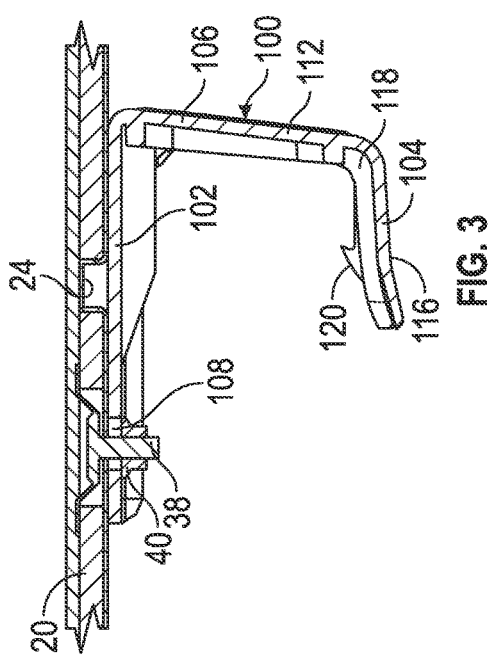
FIG. 3 is a schematic, side sectional view of the floor bracket coupled to the floor cover.
Figure 1:
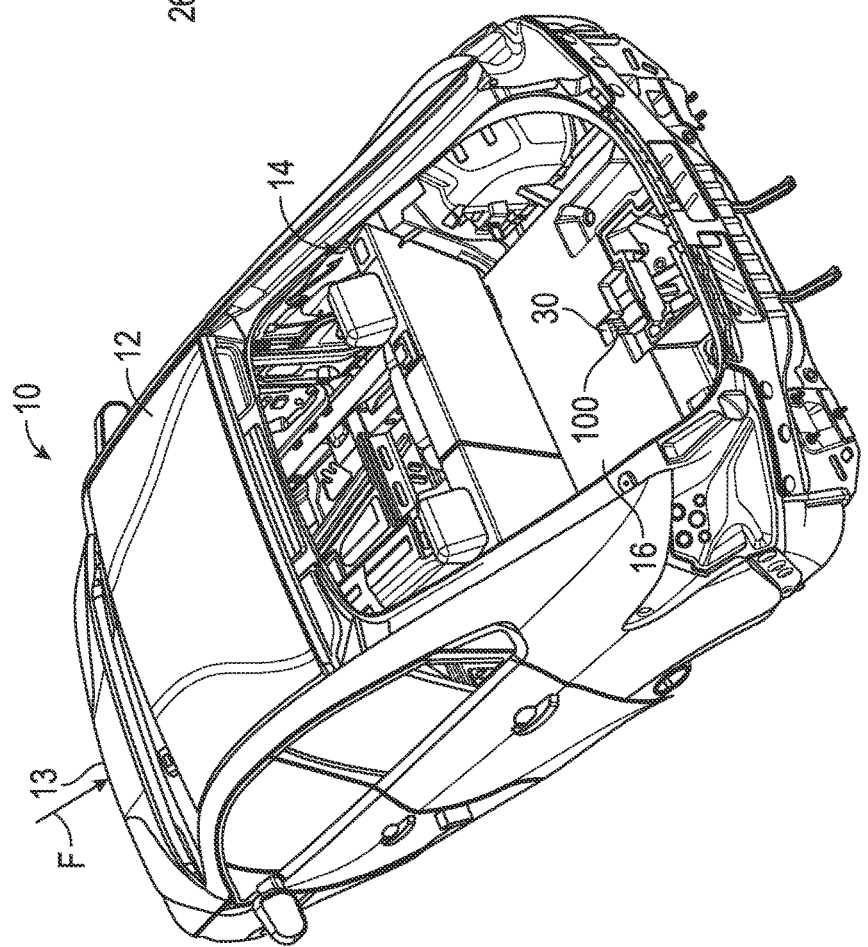
FIG. 1 is a schematic, perspective view of a vehicle including a load floor assembly.

Referring to the drawings, wherein like reference numbers correspond to like or similar components throughout the several figures, and beginning with FIGS. 1-3, a vehicle 10 includes a vehicle body 12. Although the drawings illustrate a car, the vehicle 10 can be configured as any other kind of vehicle, such as truck, a military vehicle, an autonomous vehicle, a hybrid vehicle, a watercraft, an aircraft, or any other suitable vehicle capable of transporting objects or people from one place to another. The vehicle body 12 has a cargo compartment 14 (e.g., a trunk) for storing objects, such as groceries. The vehicle 10 additionally includes a load floor assembly 16 inside the cargo compartment 14. The load floor assembly 16 can support the weight of objects placed in the cargo compartment 14.

With reference to FIGS. 1-3 and 8-10, the load floor assembly 16 includes a storage tray 18 coupled to the vehicle body 12 and a floor cover 20 for covering the storage tray 18. The storage tray 18 has a cavity 22 for storing objects O and can be wholly or partly made of expanded polypropylene foam. The floor cover 20 can be wholly or partly made of extruded polypropylene and has a living hinge 24, thereby allowing a movable portion 25 of the floor cover 20 to move relative to the storage tray 18 between an open position and a closed position. In the closed position, the floor cover 20 covers the cavity 22 of the storage tray 18. When the floor cover 20 is in the open position, the cavity 22 of the storage tray 18 is accessible.

The storage tray 18 also includes a support wall 26 adjacent the floor cover 20. As a consequence, the floor cover 20 is at least partially disposed over the support wall 26 of the storage tray 18. The support wall 26 includes a recessed portion 28. The recessed portion 28 of the support wall 26 includes a first or top support surface 32 and a second or bottom support surface 34 opposite the first support surface 32. The first support surface 32 defines a recess 30 configured, shaped, and sized to receive part of a floor bracket 100, and the second support surface 34 defines a pocket 36 configured, shaped, and sized to receive another part of the floor bracket 100.

With reference to FIGS. 3-7, the floor bracket 100 can couple the floor cover 20 to the storage tray 18 and is wholly or partly made of a suitable resilient, polymeric material. The floor bracket 100 may be wholly or partly made of a suitable thermoplastic. As a non-limiting example, the floor bracket 100 can be wholly made of an acetal (polyoxymethylene) copolymer in order to in order to maximize the extraction force necessary to decouple the floor bracket 100 from the storage tray 18 when an external force F (FIG. 1) is applied to the frontal outer surface 13 of the vehicle body 12 and minimize the insertion force necessary to assemble the floor bracket 100 onto the storage tray 18. A suitable thermoplastic for the floor bracket 100 may be, for example, the acetal copolymer sold under trademark CELCON M140. It is contemplated that the floor bracket 100 can be made using an injection molding process or any other suitable manufacturing process. Accordingly, the floor bracket 100 may be configured as an integral one-piece structure in order to minimize manufacturing costs. In the depicted embodiment, the floor bracket 100 includes a first bracket portion 102, a second bracket portion 104, and a third bracket portion 106 interconnecting the first bracket portion 102 and the second bracket portion 104. The first bracket portion 102 is configured, shaped, and sized to be at least partially received in the recess 30 of the support wall 26. To this end, the first bracket portion 102 may have a substantially planar shape in order to fit in the recess 30 of the storage tray 18. Therefore, the first bracket portion 102 extends along a longitudinal axis X. When the floor bracket 100 is coupled to the floor cover 20, the first bracket portion 102 is at least partly disposed between the floor cover 20 and the first support surface 32 of the recessed portion 28. A plurality of ribs 110 can extend from the first bracket portion 102 in order to enhance the structural integrity of the floor bracket 100. The ribs 110 may have rounded and/or planar shapes. Although the floor bracket 100 is shown in connection with the vehicle 10, the floor bracket 100 can alternatively be used to couple components of non-vehicular assemblies, such as home appliances, furniture, and farm equipment. Accordingly, the floor bracket 100 may be alternatively referred to as a bracket.

The floor bracket 100 has at least one hole 108 extending through the first bracket portion 102. In the depicted embodiment, two holes 108 extend through the first bracket portion 102. One hole 108 may be larger than the other so that it can serve as a locating feature in order to precisely locate the floor bracket 100 relative to the floor cover 20. A first fastener 38, such as a screw, can be inserted through the holes 108 and the floor cover 20 in order to couple the floor bracket 100 to the floor cover 20. A second fastener 40, such as a nut, can be tightened to the first fastener 38 and pressed against the first bracket portion 102 in order to secure the first fastener 38 to the floor bracket 100.

The third bracket portion 106 can be directly connected to the first bracket portion 102 and the second bracket portion 104. In the depicted embodiment, the third bracket portion 106 is transversely oriented relative to the first bracket portion 102 and the longitudinal axis X in order to facilitate assembly onto the storage tray 18. In addition, the third bracket portion 106 includes a planar main body 112 and a column 114 protruding from the main body 112 in order to enhance the structural integrity of the floor bracket 100. Ribs 110 can also protrude from the column 114 and/or the main body 112 in order to enhance the structural integrity of the floor bracket 100. In the depicted embodiment, some of the ribs 110 are arranged in a cross-configuration.

The second bracket portion 104 of the floor bracket 100 can be directly coupled to the third bracket portion 106 and is transversely oriented relative to the third bracket portion 106. In the depicted embodiment, the second bracket portion 104 includes a main plate 116 obliquely angled relative to the third bracket portion 106 and away from the first bracket portion 102 in order to facilitate assembly of the floor bracket 100 onto the storage tray 18. The second bracket portion 104 also includes a raised plate 118 protruding from the main plate 116 in order to enhance the structural integrity of the floor bracket 100. Ribs 110 can protrude from the raised plate 118 and/or the main plate 116 in order to enhance the structural integrity of the floor bracket 100.

The floor bracket 100 further includes at least one hook 120 extending from the second bracket portion 104 toward the third bracket portion 106. In the depicted embodiment, the floor bracket 100 includes four hooks 120 protruding directly from the raised plate 118. The four hooks 120 may be referred to as first, second, third, and fourth hooks and are parallel to each other in order to maximize the extraction force necessary to decouple the floor bracket 100 from the storage tray 18 when an external force F (FIG. 1) is applied to a frontal outer surface 13 of the vehicle body 12. Each hook 120 includes a sharp end 122 having first end surface 124 and a second end surface 126 opposite the first end surface 124. The second end surface 126 intersects the second end surface 126 at a sharp edge 128. The first end surface 124 faces the third bracket portion 106, and the second end surface 126 faces away from the third bracket portion 106. The first end surface 124 is obliquely angled relative to a first reference axis R1 that is parallel to the longitudinal axis. Accordingly, the first end surface 124 is obliquely angled relative to the longitudinal axis X. A first or internal angle α is defined between the first end surface 124 and the first reference axis R1. Because the first reference axis R1 is parallel to the longitudinal axis X, the first angle α also represents an angle between the longitudinal axis X and the first end surface 124. The first angle α may be about seventy (70) degrees in order to maximize the extraction force necessary to decouple the floor bracket 100 from the storage tray 18 when an external force F (FIG. 1) is applied to a frontal outer surface 13 of the vehicle body 12.

The second end surface 126 is obliquely angled relative to a second reference axis R2 that is parallel to the longitudinal axis X. Accordingly, the second end surface 126 is obliquely angled relative to the longitudinal axis X. A second or external angle β is defined between the second end surface 126 and the second reference axis R2. Because the second reference axis R2 is a parallel to the longitudinal axis X, the second angle β also represents an angle between the longitudinal axis X and the second end surface 126. The second angle β may be about twenty (20) degrees in order to minimize the insertion force necessary to assemble the floor bracket 100 onto the storage tray 18. Accordingly, the first angle α is greater than the second angle β in order to maximize the extraction force necessary to decouple the floor bracket 100 from the storage tray 18 when an external force F (FIG. 1) is applied to the frontal outer surface 13 of the vehicle body 12 while minimizing the insertion force necessary to assemble the floor bracket 100 onto the storage tray 18.

Each hook 120 has an insertion surface 130 facing away from the third bracket portion 106. The insertion surface 130 is shaped as a circular arc and may therefore have a constant radius of curvature C in order to minimize the insertion force necessary to assemble the floor bracket 100 onto the storage tray 18. The insertion surface 130 extends from the second end surface 126 to the second bracket portion 104. An interconnecting edge 125 (FIG. 4) interconnects (and separates) the insertion surface 130 and the second end surface 126. In the depicted embodiment, the insertion surface 130 extends from the second end surface 126 to the raised plate 118 of the second bracket portion 104. Accordingly, the constant radius of curvature C extends from the second end surface 126 to the second bracket portion 104 (e.g., the raised plate 118). The radius of curvature C may be about ten (10) millimeters in order to minimize the insertion force necessary to assemble the floor bracket 100 onto the storage tray 18.

Figure 9:
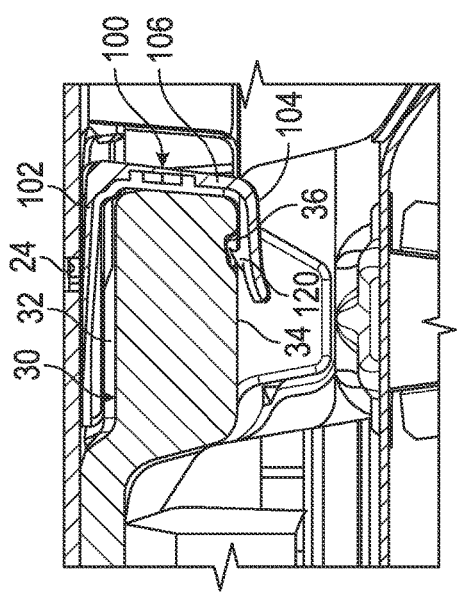
FIG. 9 is a schematic, side, cross-sectional view of the floor bracket coupled to the storage tray.
Figure 8:
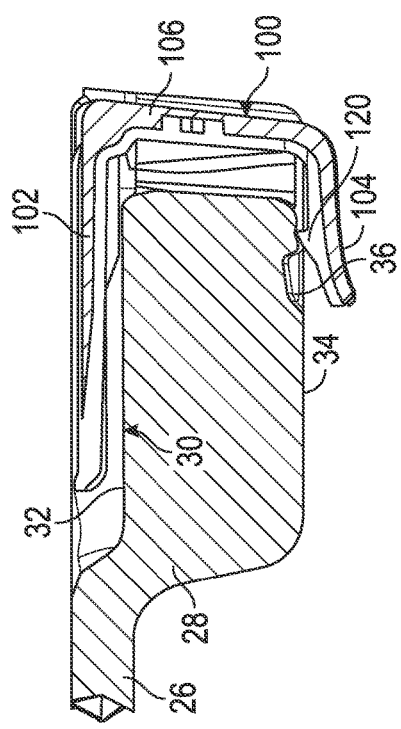
FIG. 8 is a schematic, side, cross-sectional view of the floor bracket being assembled onto the storage tray.

With reference to FIGS. 8 and 9, the floor bracket 100 can be assembled onto the storage tray 18 by placing the first bracket portion 102 into the recess 30 defined by the support wall 26. Then, the second bracket portion 104 is moved toward the second or bottom support surface 34 of the recessed portion 28 until the hooks 120 are placed inside the pocket 36. While the hooks 120 are moved toward the pocket 36, the curved shape of the insertion surface 130 and the angular orientation of the second end surface 126 facilitate movement of the hook 120 toward the pocket 36. Specifically, because of its shaped is curved, the insertion surface 130 can easily slide along the second support surface 34 of the storage tray 18 until the hooks 120 are positioned in the pocket 36. When positioned in the pocket 36, the hooks 120 extend toward the second support surface 34 of the recessed portion 28. Once the hooks 120 are in the pocket 36 as shown in FIG. 9, the first fasteners 38 (e.g., screw) can be inserted through the holes 108 and the floor cover 20 in order to couple the floor bracket 100 to the floor cover 20. Next, a second fastener 40 (e.g., nut) can be tightened to each of the first fasteners 38 in order to secure the first fastener 38 to the floor bracket 100 as shown in FIG. 3.

Figure 11:
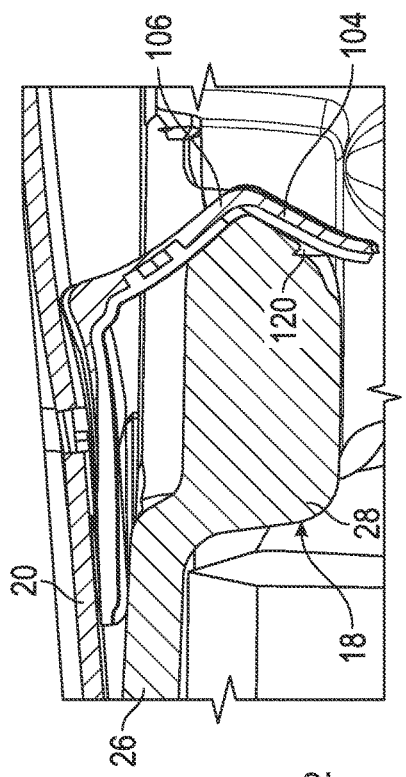
FIG. 11 is a schematic, fragmentary, side cross-sectional view of the load floor assembly while an external force is applied to the frontal outer surface of the vehicle.
Figure 10:
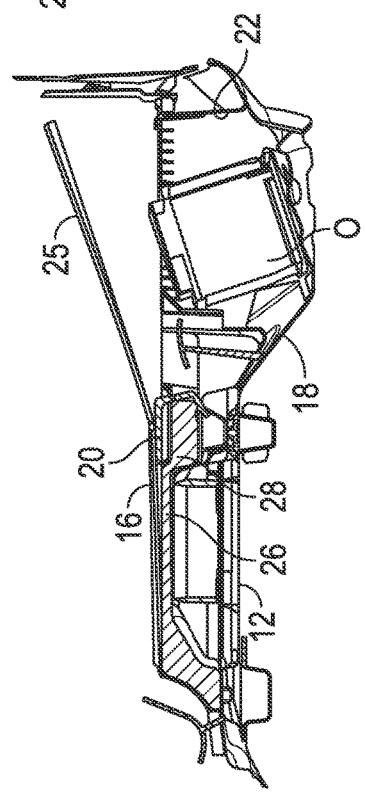
FIG. 10 is a schematic, side cross-sectional view of the load floor assembly while an external force is applied to the frontal outer surface of the vehicle.

With reference to FIGS. 1, 10 and 11, when an external force F is applied to the frontal outer surface 13 of the vehicle body 12, the floor bracket 100 maintains the floor cover 20 coupled to the storage tray 18. In response to the application of the external force F, the hooks 120 engage (e.g., penetrate) the recessed portion 28 of the support wall 26, thereby maintaining the floor bracket 100 coupled between the floor cover 20 and the storage tray 18.

While the best modes for carrying out the teachings have been described in detail, those familiar with the art to which this disclosure relates will recognize various alternative designs and embodiments for practicing the teachings within the scope of the appended claims.

The invention claimed is:

1. A vehicle, comprising:
a vehicle body defining a cargo compartment;
a load floor assembly disposed inside the cargo compartment, wherein the load floor assembly includes:
a storage tray coupled to the vehicle body, wherein the storage tray has a first support surface and a second support surface opposite the first support surface;
a floor cover at least partially disposed over the storage tray;
a floor bracket coupling the storage tray to the floor cover, wherein the floor bracket includes:
a first bracket portion, a second bracket portion, and a third bracket portion interconnecting the first bracket portion and the second bracket portion, wherein the first bracket portion extends along a longitudinal axis, and the first bracket portion is coupled to the floor cover; and
a plurality of hooks each extending from the second bracket portion toward the second support surface; and
wherein the second bracket portion is obliquely angled relative to the third bracket portion and extends away from the first bracket portion.

2. The vehicle of claim 1, wherein each of the hooks includes a sharp end, the sharp end includes a first end surface and a second end surface intersecting the first end surface at a sharp edge, the first end surface faces the third bracket portion, the second end surface faces away from the third bracket portion, the second end surface is obliquely angled relative to the longitudinal axis, and the first end surface is obliquely angled relative to the longitudinal axis.

3. The vehicle of claim 2, wherein the hook includes an insertion surface facing away from the third bracket portion, the insertion surface extends from the second end surface to the second bracket portion, and the insertion surface has a radius of curvature that extends from the second end surface to the second bracket portion.

4. The vehicle of claim 3, wherein the radius of curvature that extends from the second end surface to the second bracket portion is constant.

5. The vehicle of claim 4, wherein the radius of curvature is ten millimeters.

6. The vehicle of claim 5, wherein an angle is defined between the first end surface and the longitudinal axis, and the angle is seventy degrees.

7. The vehicle of claim 6, wherein the angle is a first angle, a second angle is defined between the second end surface and the longitudinal axis, and the second angle is twenty degrees.

8. The vehicle of claim 1, wherein the hooks are parallel to one another.

9. A vehicle, comprising:
a vehicle body defining a cargo compartment;
a load floor assembly disposed inside the cargo compartment, wherein the load floor assembly includes:
a storage tray coupled to the vehicle body, wherein the storage tray has a first support surface and a second support surface opposite the first support surface;
a floor cover at least partially disposed over the storage tray;
a floor bracket coupling the storage tray to the floor cover, wherein the floor bracket includes:
a first bracket portion, a second bracket portion, and a third bracket portion interconnecting the first bracket portion and the second bracket portion, wherein the first bracket portion extends along a longitudinal axis, and the first bracket portion is coupled to the floor cover;
a plurality of hooks each extending from the second bracket portion toward the second support surface; and
wherein the first support surface defines a recess, and the second support surface defines a pocket, the first bracket portion is disposed in the recess such that the first bracket portion is disposed between the storage tray and the floor cover, and the hooks are disposed in the pocket.

* * * * *